United States Patent [19]

Willis

[11] Patent Number: 4,945,553
[45] Date of Patent: Jul. 31, 1990

[54] INTRA-ORAL RADIOGRAPHIC FILM HOLDER

[76] Inventor: Timothy G. Willis, 310 Evergreen, Yreka, Calif. 96097

[21] Appl. No.: 335,230

[22] Filed: Apr. 10, 1989

[51] Int. Cl.$^5$ .................................................. G03B 42/02
[52] U.S. Cl. ........................................ 378/168; 378/167
[58] Field of Search ................. 378/168, 169, 170, 167

[56] References Cited

U.S. PATENT DOCUMENTS

| | | |
|---|---|---|
| 2,245,395 | 6/1941 | Goldberg . |
| 2,899,559 | 8/1959 | Maurer . |
| 3,936,643 | 2/1976 | Toner . |
| 4,592,084 | 5/1986 | McAuslan .......................... 378/168 |
| 4,593,401 | 6/1986 | Colbert ............................. 378/168 |
| 4,598,416 | 7/1986 | Donato ............................. 378/168 |
| 4,731,808 | 3/1988 | Ogunsunlade ..................... 378/168 |

Primary Examiner—Craig E. Church
Attorney, Agent, or Firm—Julian Caplan

[57] ABSTRACT

A holder for radiographic film fits between the jaws; the patient secures the holder steady by biting down thereon. The holder is U-shaped to provide space for root canal files which otherwise prevent the patient from biting down on conventional film holders. The holder accommodates placement of the film in horizontal or vertical direction and also for such placement while filming either jaw. Separate U-shaped holders may be used for anterior and posterior positions and separate posterior holders for the left and right jaws. By inverting the right lower posterior holder, it may be used on the upper left.

8 Claims, 2 Drawing Sheets

INTRA-ORAL RADIOGRAPHIC FILM HOLDER

BACKGROUND OF THE INVENTION

1. Field of the Invention

This invention relates to a new and improved intraoral radiographic film holder particularly useful in root canal dentistry. More particularly, the invention relates to a holder for radiographic film which may be positioned between the jaws of the patient in such a position as to support a radiographic film on the lingual side of the teeth. The device is characterized by the fact that there is a recess therein which accommodates the protrusion of root canal files permitting the dentist to determine the progress of the use of the files by an X-ray film. Heretofore, known holders have not been usable for such purpose because the projecting files interfere with the patient's bite.

2. Description of Related Art

Radiographic film holders are well known in the art. Such holders have a bit block or other means which extends from behind the teeth between the jaws. By biting down on the protruding portion of the holder, the film is held stationary while the X-ray is being taken. However, in root canal surgery, if the dentist wishes to use radiographic means to determine whether the files commonly used in such process have extended to the full depth of the canal, the protruding end of the file interferes with the patient's bite and makes it impossible to use ordinary film holders. By providing a recess in the holder of the present invention for protrusion of the ends of the files, the problem heretofore has been overcome. The holder also functions as a wedge-shaped or V-shaped bite block for uses other than root canal surgery.

SUMMARY OF THE INVENTION

During root canal therapy, files protrude from the tooth under treatment. In order to get an accurate determination of whether the file has penetrated the full length of the root canal, radiographic means is commonly employed. It has heretofore been difficult to obtain an accurate picture with the files in place. The present invention provides for a rapid, easy, accurate means for holding the radiographic film and the patient is not made uncomfortable thereby.

Thus the holder is placed between the jaws so that the patient may bite down thereon, but a recess is formed in the block on which the patient bites to accommodate the protruding end of the file. The holder has provision for attachment of a film packet on the lingual side of the jaw and the holding means is so constructed that the packet may be positioned with its long side horizontal or vertical and extending up or down.

Although the device is primarily designed for root canal therapy, it is equally comfortable for ordinary X-rays used in dentistry. Thus the device may be used as a bit block.

A feature of the present invention is that it is useful as a posterior intra-oral radiographic film holder useful both for root canal and ordinary dentistry.

Another feature of the invention is the fact that the holder has a U-shaped design—i.e., it is formed with a recess—to provide for root canal files.

Another feature of the invention is that the form of the invention for a posterior X-ray holder incorporates a bite block to hold the mouth open during radiographic filming.

Another feature of the invention is the fact that it is an anterior X-ray holder with a bite block.

Still another feature of the invention is the fact that it is an anterior X-ray holder designed to accommodate a root canal file.

Still another feature or the invention is the fact that the holder is shaped to accommodate posterior use for the right upper jaw and if turned upside down may be used in the left lower jaw.

Still another feature of the device is the fact that the anterior holder may be turned upside down for the lower anterior teeth.

In root canal therapy rubber dams are sometimes clamped to the affected teeth. The present invention functions despite the presence of dam frames and clamps since there is adequate space provided therefor.

Other objects of the present invention will become apparent upon reading the following specification and referring to the accompanying drawings in which similar characters of reference represent corresponding parts in each of the several views.

DESCRIPTION OF PREFERRED EMBODIMENTS

Figure 2:
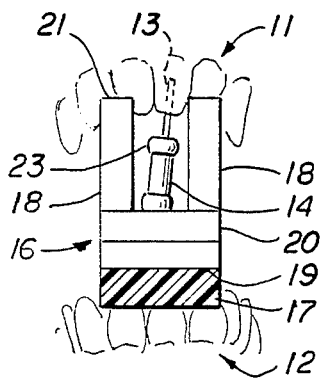
FIG. 2 is a sectional view taken substantially along the line 2—2 of FIG. 1.
Figure 3:
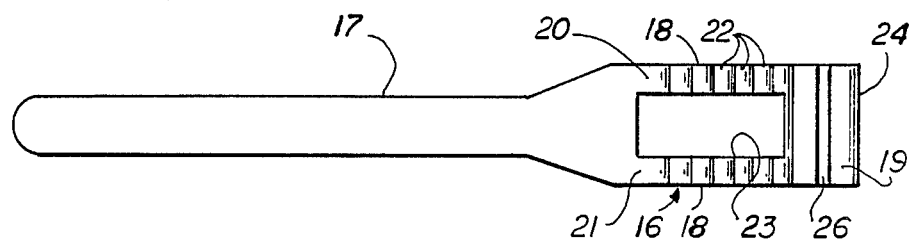
FIG. 3 is a top plan view of the holder of FIG. 1.

Shown in FIGS. 1–4 is an anterior holder in a position for use in root canal therapy in the upper jaw. The device need merely be inverted to accommodate similar usage in the lower jaw. It will be further understood that the device is useful even in instances where root canal surgery is not employed.

The holder is used between the upper teeth 11 and lower teeth 12. Shown in one of the upper teeth 11 is a root canal file 13 which has a handle 14 on its proximal end. The file 13 is advanced along the canal to remove all material in the canal. It is necessary to insure that the file has penetrated the entire canal and this is commonly done by radiographic means. Because the handle 14 is positioned between the jaws 11 and 12, it interferes with the patient's bite and thus makes it difficult to position the film pack in a conventional holder during exposure.

Figure 1:
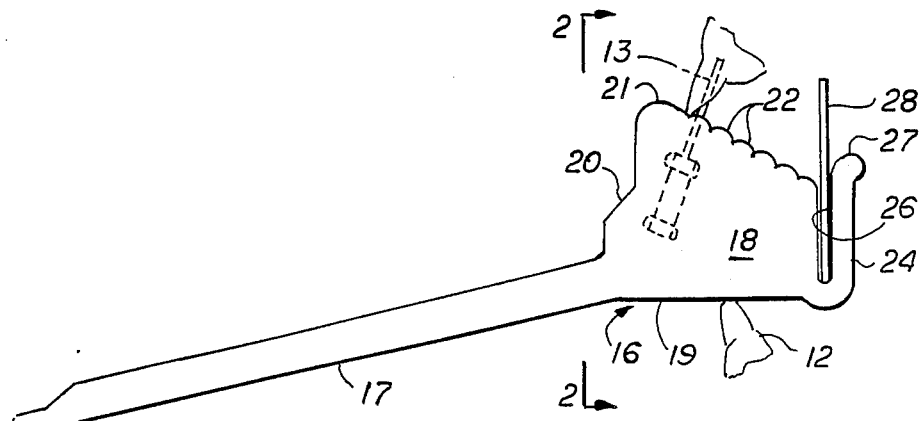
FIG. 1 is a schematic side elevational view showing the anterior device in position of use.
Figure 4:
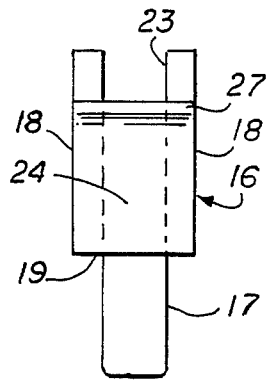
FIG. 4 is an end elevational view from the lingual side.
Figure 5:
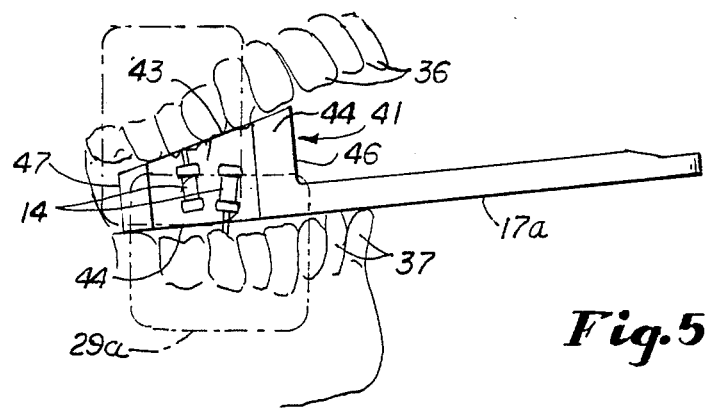
FIG. 5 is a view similar to FIG. 1 showing a posterior intra-oral film holder.

The present invention employs a bite block 16 which has a handle 17 extending outwardly of the jaw. Bite block 16 has parallel vertical sides 18, a bottom 19 perpendicular to the sides 18 and a proximal end 20 here shown to be of irregular shape. Top 21 slants downward inward as best shown in FIG. 1. On the top 21 are plural transverse ridges which assist in the bite of the upper teeth 11. Recess 23 extends from top 21 through to bottom 29 and is of sufficient size so that the handles 14 of files 13 are accommodated thereby. Directing attention to FIG. 2 it will be seen that the proximal end 20 terminates at about the level of the bottom of the recess 23. The distal end 24 is generally perpendicular to bottom 19. A slot 26 is formed near the distal end and a rearward curving lip 27 is formed above the level of top 21. The lip 27 assists in insertion of a film packet 29 in the slot 26. Such film packets are generally of a rectangular (as distinguished from square) shape. It will be understood that the packet 29 may be positioned with either its wider or narrower ends uppermost.

In use, the dentist or technician inserts a film packet 29 in slot 26, positioning the packet in the most desirable position. Assuming that the file 13 is inserted in the upper jaw, as shown in FIGS. 1 and 2, the top 21 is positioned uppermost so that the handle 14 is accommodated by the recess 23. The patient then bites down on block 16 and this secures the film packet 29 in proper position. The ridges 22 assist in positioning the film packet 29 as close to the tooth 11 as desired.

If it is necessary to use the device in radiographic filming of a lower tooth 12, the block 16 is merely inverted.

Figure 6:
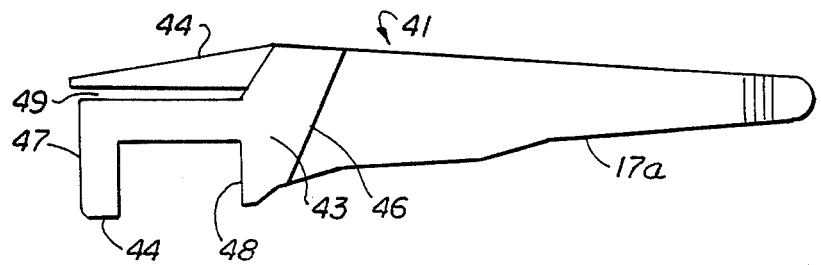
FIG. 6 is a top plan view of the posterior device.
Figure 7:
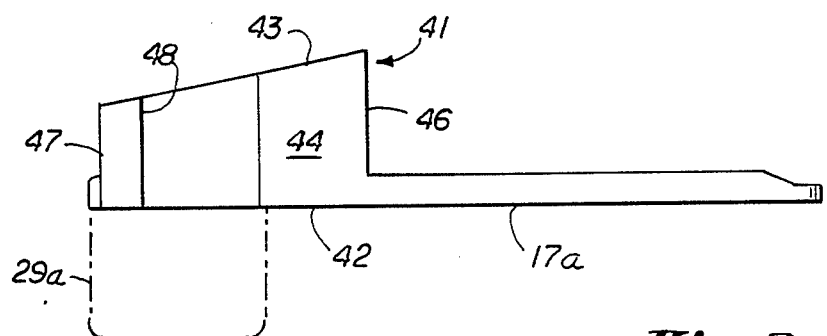
FIG. 7 is a side elevational view.
Figure 8:
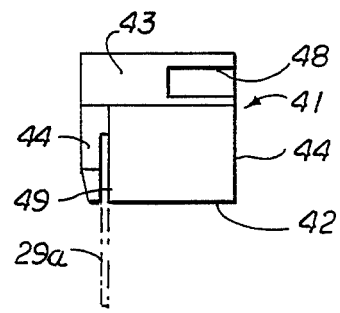
FIG. 8 is a front elevational view thereof.

Directing attention now to FIGS. 5–8, upper posterior teeth 36 and lower posterior teeth 37 are illustrated schematically. Bite block 41 is connected to handle 17a which extends out between the lips. The bite block is generally wedge-shaped, as shown in FIG. 7, having a bottom 42 generally parallel to handle 17a and a downward inward slanted top 43. The sides 44 are generally parallel and perpendicular to bottom 42. Proximal end 46 extends generally upward perpendicular to handle 17 and distal end 47 is generally parallel to proximal end 46. In one of the sides 44 is formed a U-shaped recess 48 to accommodate the file handles 14. Behind recess 48 as viewed in FIG. 6 is a slot 49 to receive the film packet 29a. It will be seen that the packet 29a may be inserted in the slot 49 so that it is extending vertically upward, vertically downward, or horizontally upward or horizontally downward, as required.

Preferably there are separate posterior and anterior holders. The anterior holder may, however, be inverted so that the left upper jaw holder is useful for the right lower jaw.

In several respects the elements of FIGS. 5–8 resemble those of FIGS. 1–4 and the same reference numerals followed by the subscript a are used to designate corresponding parts.

What is claimed is:

1. A radiographic film packet holder comprising a bite block having first and second parallel sides, said sides having converging top and bottom surfaces shaped and positioned to fit between the upper and lower teeth of a patient so that the patient may clamp said bite block between the teeth, a distal end perpendicular to said sides, a recess formed in said block bounded by said distal end and said sides and shaped to accept the exposed end of a root canal file protruding from one of the teeth of the patient, retainer means on the lingual end of said bite block shaped to receive and retain against unintentional dislodgment a portion of a film packet and to retain said packet positioned lingually of a selected tooth and parallel to said distal end, and a handle fixed to and extending from said block in a direction to extend out between the lips of the patient.

2. A holder according to claim 1 in which said top is formed with a plurality of transverse ridges.

3. A holder according to claim 1 which further comprises a proximal end forming the proximal edges of said first and second parallel sides and perpendicular thereto and in which said recess is rectangular when viewed from said top surface, said recess being bounded by said distal and proximal ends and said first and second sides.

4. A holder according to claim 3 in which the lower edges of said first and second sides and of said proximal and distal ends are substantially co-planar and the upper edges said first and second sides converge distally and at their distal termini are substantially co-planar with the upper edge of said distal end.

5. A holder according to claim 1 in which said retainer means comprises a lip connected to said bite block and positioned parallel to and lingually with respect to said distal end forming with said distal end a slot to receive said film packet.

6. A holder according to claim 5 in which said lip extends no higher than said distal end.

7. A radiographic film packet holder comprising a bite block having first and second sides and distally converging top and bottom surfaces shaped and positioned to fit between the upper and lower teeth of a patient so that the patient may clamp said bite block between the teeth, a distal end and a proximal end, a recess formed in said block inward of said first side and bounded by said proximal end, said distal end and said second side, said recess being open on said first side, said recess being shaped to accept the exposed end of a root canal file protruding from one of the teeth of the patient, said proximal end being higher than said distal end, said distal end having a first edge substantially co-planar with said bottom surface and a second edge slanting substantially co-planar with said top surface, and retainer means formed in said block adjacent said second side shaped to receive and retain against unintentional dislodgment a portion of a film packet and to retain said packet positioned lingually of a selected tooth and parallel to said second side, and a handle fixed to and extending from said proximal end in a direction to extend out between the lips of the patient.

8. A holder according to claim 7 in which said first and second sides converge proximally from said distal end.

* * * * *